July 5, 1966  S. J. RUBIN  3,259,771
SYNCHRONOUS MOTORS
Filed May 13, 1963  2 Sheets-Sheet 1

INVENTOR.
Samuel J. Rubin.
BY Samuel W. Kipnis
Atty.

July 5, 1966  S. J. RUBIN  3,259,771
SYNCHRONOUS MOTORS
Filed May 13, 1963  2 Sheets-Sheet 2
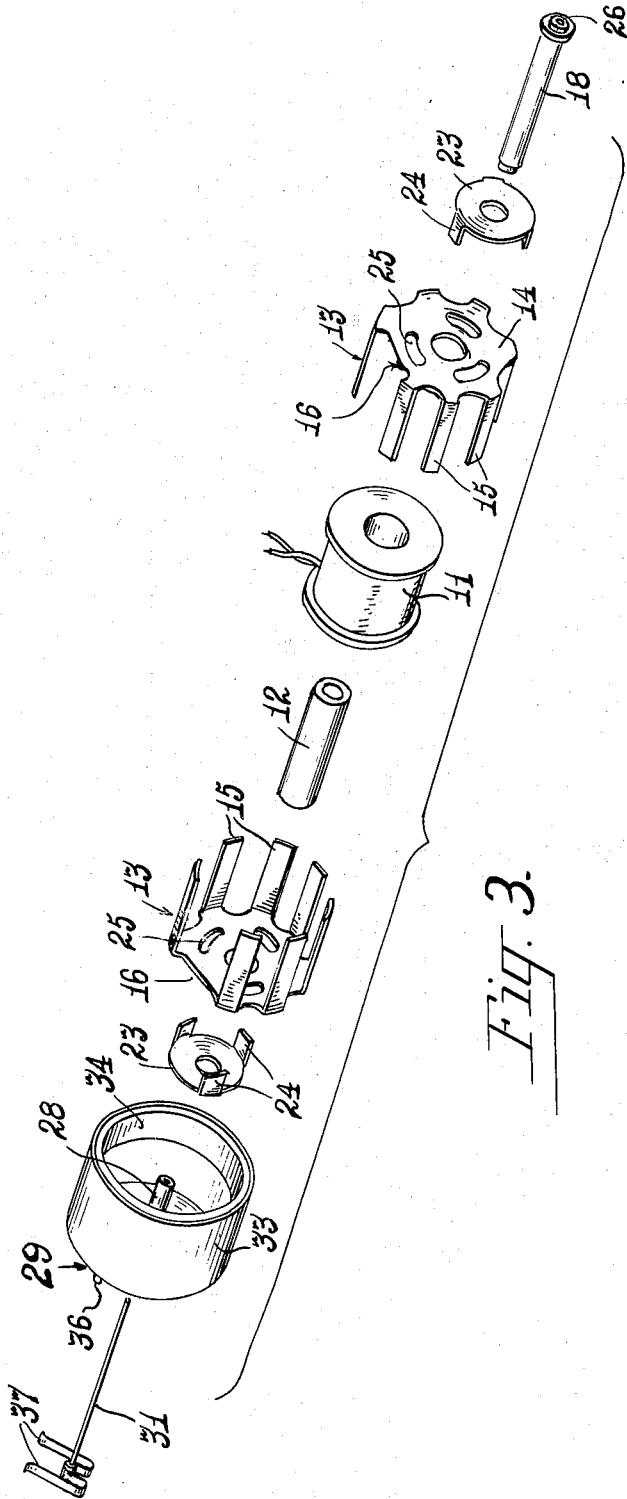
INVENTOR.
Samuel J. Rubin
BY Samuel W. Kipnis
Atty.

United States Patent Office 3,259,771
Patented July 5, 1966

3,259,771
SYNCHRONOUS MOTORS
Samuel J. Rubin, 971 Wade St., Highland Park, Ill.
Filed May 13, 1963, Ser. No. 279,705
8 Claims. (Cl. 310—164)

This invention relates to improvements in permanent magnet synchronous motors and more particularly to the construction and assembly of a relatively low cost motor having greater starting and running torque.

Heretofore, permanent magnet synchronous motor structures have been of two basic designs. Either, they have a permanent magnet ring or rotor surrounding the pole pieces with the coil located in the center of the pole pieces, or they embody a permanent magnet or rotor in the center of the pole pieces with the field coil located on the outside or beneath the pole pieces. In all known prior constructions, the pole pieces are firmly attached to the field coil and are held stationary. The permanent magnet rotor on such motors is so designed as to attain a desirable light weight to facilitate starting. This can best be understood when it is appreciated that in motors of the prior types, the rotor normally comes to rest with its poles directly opposite to the stator poles because these are positions of minimum magnetic reluctance of the gaps between the rotor and stator poles. This is most disadvantageous for starting, hence the requisite lightness in the weight of the rotor in motors of known construction. Thus, the weight of the permanent magnet rotor is a critical factor. Its lightness determines its starting ability and its heaviness determines its running torque.

In order to increase the running torque and thus render the motor suitable for driving loads exceeding those possible with permanent magnet motors of known construction, applicant provides the outer ring type rotor with a permanent magnet of far greater size and weight than heretofore attempted. Normally, because of the added weight, it would be difficult if not impossible to start the motor, if the motor were constructed in the conventional manner. Applicant has overcome this basic difficulty by designing the pole pieces in the form of a light weight cage which is free to oscillate relative to the field coil and rotor. When the coil of the motor is energized with A.-C. current, the alternate attraction and repulsion causes the cage to oscillate freely. This activity stimulates motion in the heavy rotor. As soon as this motion is imparted to the rotor, it immediately overcomes the standing inertia and begins to rotate.

Also, for more positive starting ability the load on the motor should not be connected directly to the rotor, but is here connected through a novel flexible spring drive.

It is therefore an object of the invention to provide a novelly constructed permanent magnet synchronous motor.

It is another object of the invention to provide a permanent magnet synchronous motor with oscillatable pole pieces.

Another object is to provide a novel drive connection between the rotor and the shaft driven thereby.

Another object is to provide a permanent magnet synchronous motor having field means comprising opposed nested pole pieces freely rotatable relative to the field coil and enclosing same to assist starting rotation of the rotor.

Another object is to provide a permanent magnet synchronous motor of the character described that is not expensive to construct, is very efficient in use and one that has relatively low current consumption for a given output and producing, in a highly efficient manner, both self starting and high driving torque.

The structure by means of which the above noted and other advantages and objects of the invention are attained will be described in the following specification, taken in conjunction with the accompanying drawings, showing a preferred illustrative embodiment of the invention, and in which:

FIG. 3 is an exploded perspective view of the parts of the motor.

Figure 1:
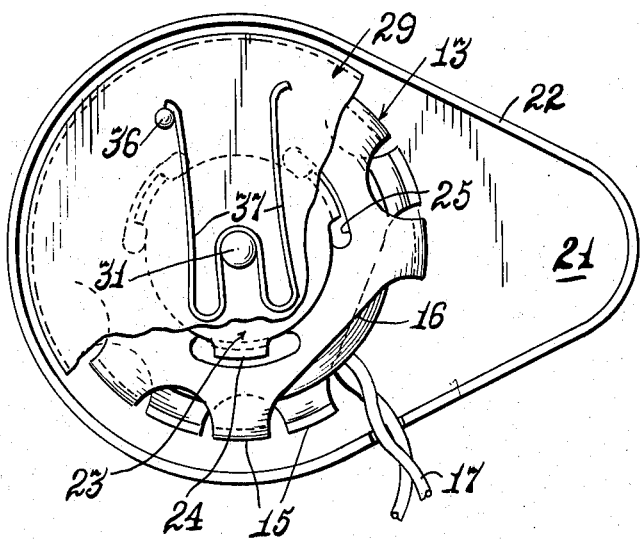
FIG. 1 is a plan view of the motor, showing parts broken away.
Figure 2:
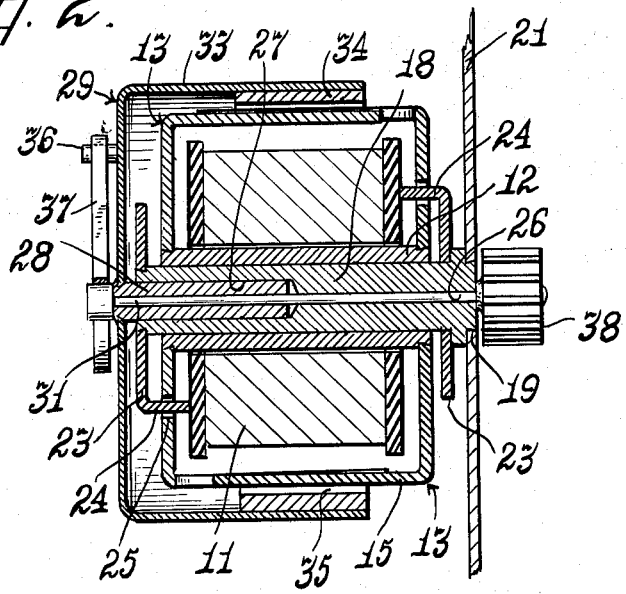
FIG. 2 is a diametrical sectional view of the motor.

Referring to the accompanying drawings showing an exemplary embodiment of the new permanent magnet synchronous motor, said motor comprises a single phase coil or winding 11 having a hollow core through which a freely rotatable tubular sleeve 12 extends. The sleeve 12 mounts at each end, firmly, a field casing or cage section 13 each of which comprises a magnetizable disc 14 and a plurality of circumferentially spaced magnetizable teeth 15 forming pole pieces disposed at approximately right angles to the disc. The field casings or cages are assembled and staked on the ends of the sleeve with their teeth staggered and extending inwardly over and embracing the coil 11, loosely. The teeth of one cage are disposed between the teeth of the other cage. As best shown in FIG. 3, at least one of the teeth 15 of each cage is removed so as to afford a wide gap 16 in each through which the lead wires 17 to the coil may extend to their usual source of current supply.

The cage assembly is mounted for free rotation over a stud 18 that is anchored firmly at one end, as at 19, to the end wall 21 of a housing 22. Also mounted on said stud 18, one outwardly of each field casing section 13 and secured against rotation, is a stabilizer plate 23 having three circumferentially spaced legs 24 that extend through circumferential slots 25 in the respective field casing discs 14 and bear firmly against the ends of coil 11 to stabilize it relative to discs 14 and hold it against rotation. The slots 25 are of a length greater than the width of legs 24 so as to allow said field cages to oscillatably rotate in a manner and for a purpose to be made apparent presently.

The stud 18 has an axial bore 26 and is countersunk at its unmounted end, as at 27, to receive for free rotation therein a bearing shank 28 integral with a rotor member 29 and a freely rotatable power take-off stem 31. The rotor member comprises a cup-shaped body made of a material, such as aluminum, which develops substantially no hysteresis torque, and which has secured firmly on the inside surface of its cylindrical wall 33, an annular magnet 34 which, when the parts are assembled, overlies but is spaced from the nested field casings or cages, leaving a gap 35.

For a purpose to be explained presently, the rotor member 29 is mounted for free rotation on stem 31 but is operably connected thereto, so as to rotate said stem, through a radially located stud 36 which abuts one or the other of a pair of spring elements 37 that radiate from stem 31. The free end of the stem 31 extends out through housing end wall 21 and carries a pinion 38 or other driving arrangement for transmitting its torque to the parts which are to be driven by the motor.

It should be apparent from the foregoing that the field coil 11 is held stationary at all times and that the field casings or cages 13 are free to oscillatably rotate relative to said field coil whereas the rotor member 29 is freely rotatable relative to such assembly.

It will be understood that when alternating current is flowing in opposite directions through the field coil, the magnetic flux in the gap between the coil and rotor will impart oscillatable rotation to the cage which in turn will break the standing inertia of and cause the heavy rotor member to rotate and drive stem 31.

When the motor is idle, it may sometimes occur that an end of the slots 25 in the field cages 13 are in abutment with legs 24 which constitute stops to limit rotation of the cages in the direction of the stops. Now, when A.-C. current is fed to the field coil and the cages are so held against movement in one direction, the alternate attraction and repulsion of the cages will carry them away from the stop and set up sufficient impedance to start rotation of rotor member 29.

Although I have described a preferred embodiment of my invention, in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

Having described my invention, what I claim and desire to secure by Letters Patent of the United States is:

1. A permanent magnet synchronous motor comprising a non-rotatable field coil, a plurality of cage-like elements nested together and surrounding said field coil, means mounting said cage-like elements to allow said elements to be oscillatably rotatable relative to the field coil, means to limit the degree of oscillatable rotation of said cage-like field elements, and a permanent magnet rotor overlying and forming an air gap with the cage-like elements.

2. A permanent magnet synchronous motor comprising a field coil, two circular cage-like elements surrounding the field coil, means connecting said cage-like elements to form a unitary structure, a generally cup-shaped carrier mounting a permanent magnet ring and telescoped over the cage-like elements, said carrier being rotatable relative to the cage-like elements and to the field coil and forming an air-gap between the permanent magnet ring and said cage-like elements, and means mounting said cage-like elements operable to permit said cage-like elements to oscillatably rotate under the influence of magnetic flux in said air-gap when current is supplied to the field coil, and means to limit the degree of oscillatable rotation of the cage-like elements in either direction.

3. A permanent magnet synchronous motor comprising a core carrying an energizing coil, means to restrain the energizing coil against rotation, a cage-like field element enclosing said energizing coil, means mounting said cage-like field element effective to allow said elements to oscillatably rotate relative to said energizing coil, and means to limit the degree of oscillatable rotation of said cage-like field elements, a rotor comprising a generally cup-shaped carrier mounting an armature telescoped over said cage-like field element, said armature forming an air-gap with the cage-like field element.

4. A permanent magnet synchronous motor comprising, a rigid core, a sleeve mounted on said core and rotatable on said core, a field coil telescoped over said sleeve, plate-like field elements mounted firmly on said sleeve each having peripherally disposed pole pieces overlying the field coil, means mounting said sleeve and plate-like field elements to allow them to oscillatably rotate, means to prevent rotation of the field coil, means connected with and operable to limit the degree of oscillatable rotation of the field elements relative to said field coil, a rotor mounting an armature telescoped over said field elements, said armature forming an air-gap with said field elements, means on said rotor journalling it for free rotation in the core, a shaft extending through the rotor and core and mounting power take-off means, and means connecting the rotor with said shaft.

5. A permanent magnet synchronous motor comprising, a non-rotatable core, a sleeve telescoped over and rotatable on said core, a field coil telescoped loosely over said sleeve, plate-like field elements mounted firmly on said sleeve, means mounting said sleeve and plate-like field elements to allow them to oscillatably rotate, peripherally disposed pole pieces on said plate-like field elements extending toward one another and surrounding the field coil, means to prevent rotation of the field coil, said means being engageable by the plate-like field elements to limit the degree of oscillatable rotation of said elements in either direction, a rotor comprising a generally cup-shaped carrier mounting a permanent magnet ring telescoped over the coil-cage assembly, a shaft extending freely through said rotor and core and mounting power take-off means at one end, and a drive connection between said rotor and shaft.

6. A permanent magnet synchronous motor comprising, a non-rotatable core, a sleeve telescoped over and rotatable on said core, a field coil telescoped loosely over said sleeve, plate-like field elements mounted firmly on said sleeve, means mounting said sleeve and plate-like field elements to allow them to oscillatably rotate, peripherally disposed pole pieces on said plate-like field elements extending toward one another and surrounding the field coil, means to prevent rotation of the field coil, said means being engageable by the plate-like field elements to limit the degree of oscillatable rotation of said elements in either direction, a rotor comprising a generally cup-shaped carrier mounting a permanent magnet ring telescoped over the coil-cage assembly, a shaft extending freely through said rotor and core and mounting power take-off means at one end, spring means carried by said shaft, and means on said rotor engageable with said spring means to provide a drive connection between the rotor and shaft.

7. A permanent magnet synchronous motor comprising, a non-rotatable core, a sleeve telescoped over and rotatable on said core, a field coil telescoped loosely over said sleeve, plate-like field elements mounted firmly on said sleeve, means mounting said sleeve and plate-like elements to allow them to oscillatably rotate, peripherally disposed pole pieces on said plate-like field elements extending toward one another and surrounding the field coil, means engageable by the plate-like field elements to limit the degree of oscillatable rotation of said elements in either direction, a rotor comprising a generally cup-shaped carrier mounting a permanent magnet ring telescoped over the coil-cage assembly, a shaft extending freely through said rotor and core and mounting power take-off means at one end, spring means carried by said shaft, and means on said rotor engageable with said spring means to provide a drive connection between the rotor and shaft.

8. A permanent magnet synchronous motor comprising, a non-rotatable core, a sleeve telescoped over and rotatable on said core, a field coil telescoped loosely over said sleeve, plate-like field elements mounted firmly on said sleeve, means mounting said sleeve and plate-like elements to allow them to oscillatably rotate, peripherally disposed pole pieces on said plate-like field elements extending toward one another and surrounding the field coil, means engageable by the plate-like field elements to limit the degree of oscillatable rotation of said elements in either direction, a rotor mounting a permanent magnet telescoped over the coil-cage assembly, a shaft extending freely through said rotor and core and mounting power-take-off means at one end, spring means carried by said shaft, and means on said rotor engageable with said spring means to provide a drive connection between the rotor and shaft.

References Cited by the Examiner
UNITED STATES PATENTS

| | | | |
|---|---|---|---|
| 2,250,395 | 7/1941 | Russell | 310—164 |
| 2,823,324 | 2/1958 | Davis | 310—164 X |
| 3,082,336 | 3/1963 | Poole | 318—162 X |
| 3,122,666 | 2/1964 | Guiot | 310—162 X |

MILTON O. HIRSHFIELD, *Primary Examiner.*

L. L. SMITH, *Assistant Examiner.*